United States Patent [19]
McCall et al.

[11] Patent Number: 5,375,673
[45] Date of Patent: Dec. 27, 1994

[54] GOLF BAG CARD ACCESSORY DRIVE UNIT

[76] Inventors: Amiel J. McCall, 18 Moran Cir., Sudbury, Mass. 01776; Roger M. Marino, 115 Lake Rd., Sherborn, Mass. 01770

[21] Appl. No.: 41,854

[22] Filed: Apr. 2, 1993

[51] Int. Cl.$^5$ ............................................. B62D 51/04
[52] U.S. Cl. ..................... 180/13; 180/19.1; 180/19.2; 180/19.3; 280/DIG. 5
[58] Field of Search ................... 180/11, 12, 13, 19.1, 180/19.2, 19.3; 280/DIG. 5

[56] References Cited
U.S. PATENT DOCUMENTS

| | | | |
|---|---|---|---|
| 2,706,008 | 4/1955 | Voigt | 180/19.2 |
| 3,948,332 | 4/1976 | Tyner | 180/19.1 |
| 5,265,686 | 11/1993 | Machen | 280/DIG. 5 |

*Primary Examiner*—Mitchell J. Hill
*Attorney, Agent, or Firm*—William Nitkin

[57] ABSTRACT

An accessory drive unit for attachment to the central support member of a non-motorized golf bag cart having two rear wheels, the accessory drive unit including a front wheel drive unit having a front wheel, a motor within the front wheel, control circuitry for controlling the speed and direction of rotation of the front wheel, and structure to steer the front wheel unit.

5 Claims, 2 Drawing Sheets

GOLF BAG CARD ACCESSORY DRIVE UNIT

BACKGROUND OF THE INVENTION

1. Field of the Invention

The device of this invention resides in the area of golf bag carts and more particularly relates to an accessory drive unit for attachment to a golf bag cart to convert such golf bag cart to a collapsible, portable, self-propelled and electrically powered golf bag cart which can be controlled, either manually or remotely, by the user.

2. Description of the Prior Art

Self-propelled electric golf bag carts are known in the prior art and are used by those who do not wish to pull their golf bag carts around a golf course. Such carts have two rear wheels, one disposed on each side of a central housing containing a battery, and a front wheel extending on a post away from the central housing on which front wheel assembly the rear of the bag is supported. A handle extends rearward from the central housing on which handle the front of the golf bag is supported. These carts are bulky, heavy and difficult to transport to and from the golf course.

SUMMARY OF THE INVENTION

It is an object of this invention to provide an accessory device being a self-propelled front wheel assembly unit which is attachable to an existing, non-motorized golf bag cart to convert it to a self-propelled electric golf bag cart.

It is a further object of this invention to provide an improved lightweight, portable, collapsible and self-propelled electric golf bag cart incorporating a motorized front wheel, which device can be manually steered or operated by remote control.

In furtherance of these objects a front wheel, which in a preferred embodiment can be a wide wheel for greater traction, is provided with a drive motor enclosed therein with its axle disposed extending between the sides of a yoke member. Above the yoke member can be disposed a steering motor to steer the front wheel either to the left or to the right ms the wheel rotates in either a forward or reverse direction by the drive motor contained within the wheel. Utilized in combination with this unit are an electric battery pack and electrical control mechanisms as will be described further below. The unit of this invention can be an integral part of a golf bag cart having two freely rotating rear wheels which are not motor driven but which form a part of a cart base upon which the user's golf bag can be mounted. The self-propelled front wheel of this invention can be adapted for installation on an existing golf bag cart. By utilizing the device of this invention, an existing golf bag cart can be converted to be a self-propelled golf bag cart for the benefit of the golfer who wishes to motorize his own golf bag cart to enjoy the benefits of his lightweight, portable and collapsible cart at a lower cost than buying a new motorized golf bag cart.

DESCRIPTION OF THE PREFERRED EMBODIMENT(S)

Figure 1:
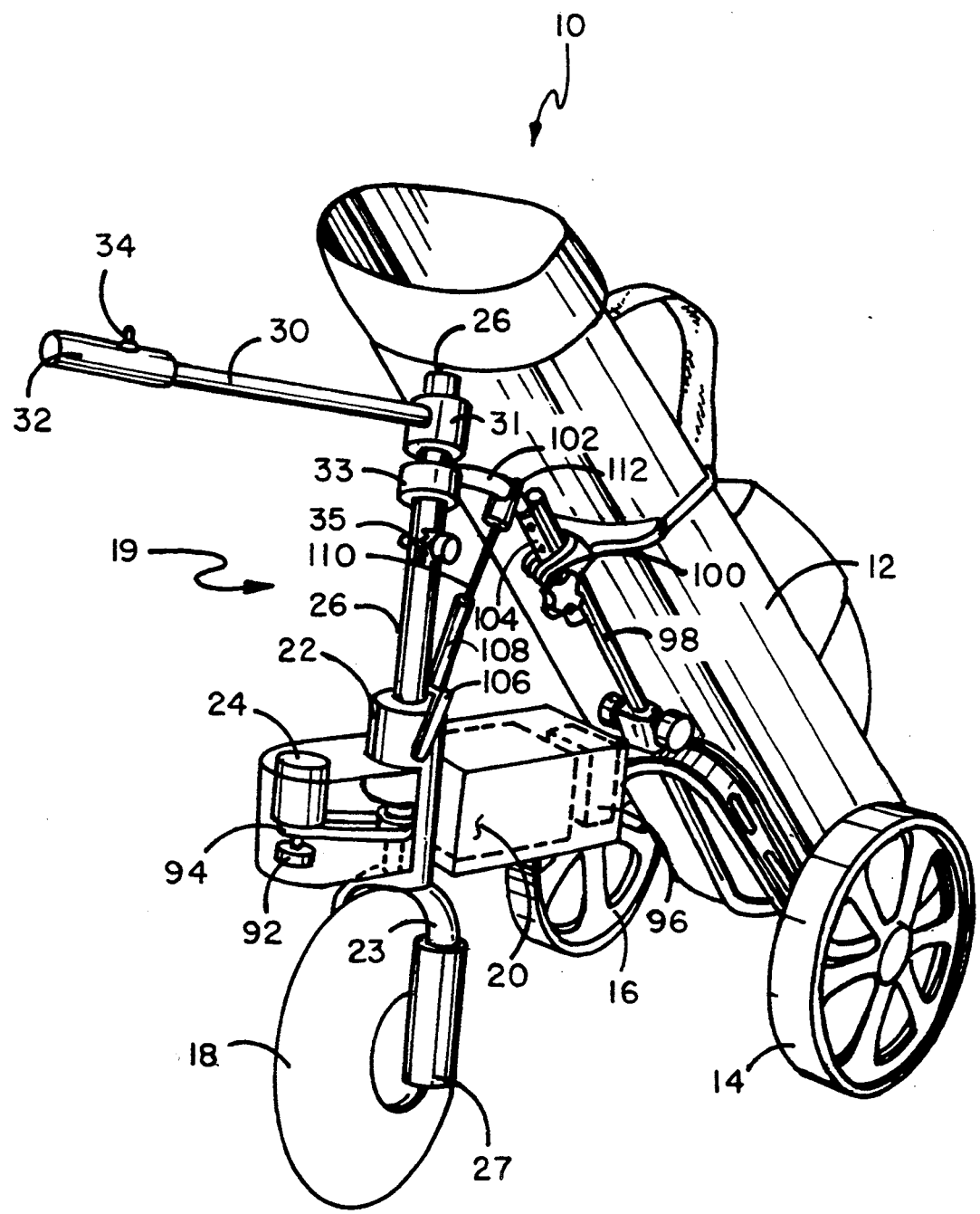
FIG. 1 illustrates a perspective view of the device of this invention installed on an existing golf bag cart.

FIG. 1 illustrates, in part, golf cart 10 such as found in the prior art with rear wheels 14 and 16 with a golf bag 12 mounted thereon. Rear wheels 14 and 16 are of the type which are mounted on support members that can be collapsed inwardly for storage of the golf cart. A cart central support member 98 extends upward under the bag which bag rests on typical brackets on such support member and which central support member 98 terminates in an adjustable handle folding member 100 which has handle receipt member 104 thereon for receiving the handle of the golf bag in normal use which handle, not seen in the Figures as it is not used in the present invention, would extend further upward and would have a grasping means at its end for the user to grasp to pull the cart around. When the prior art cart with its extending handle is to be stored, the rear wheels are folded inward and adjustable handle folding member 100 is loosened, allowing the handle to be rotated downward so that the handle then extends downward generally parallel to central support member 98 of the cart, thereby allowing the cart to occupy less space when stored. Once the original cart handle is removed, handle receipt member 104 acts as the attachment for drive unit 19 of this invention.

Figure 2:
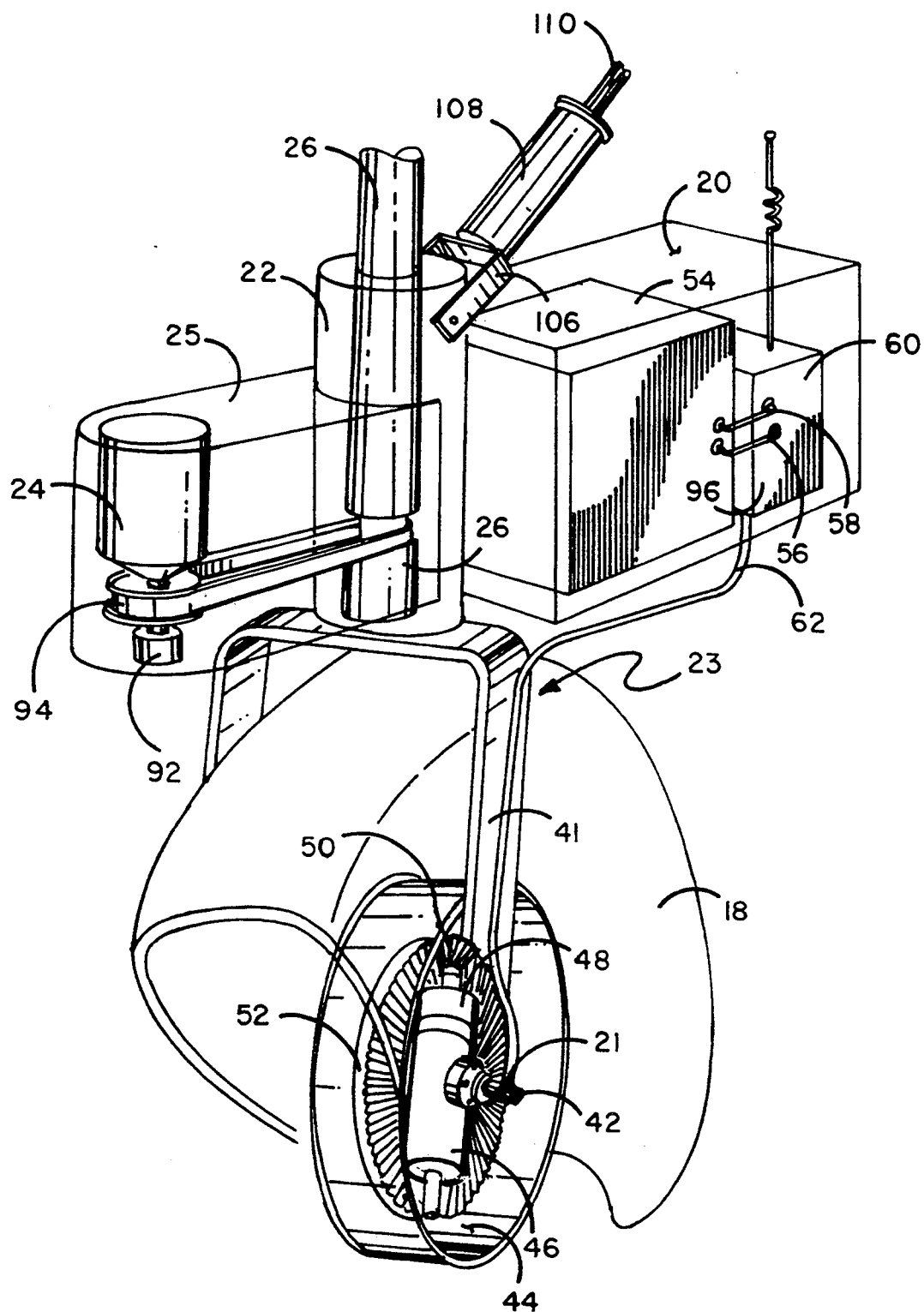
FIG. 2 illustrates a perspective view of the accessory drive wheel unit of this invention with portions cut away.

Drive unit 19 of this invention incorporates front wheel 18 which contains a drive motor therein which front wheel 18 is supported within yoke 23 by axle members extending from the wheel such as first axle shaft member 42 seen in FIG. 2 with a second axle seen disposed opposite the first axle so that front wheel 18 rotates within yoke 23. Yoke 23 at its top is attached to shaft member 26. Shaft member 26 can be either manually or remotely rotated for the steering of front wheel 18. If shaft member 26 is to be manually steered, a steering handle shaft coupling 31 attached to the top of shaft member 26 is provided for the engagement of shaft 26 to steering handle 30 which handle, when manually moved to the right or left by grasping and moving grip 32, will rotate shaft member 26 and attached yoke 23 to the right or to the left and therefore steer front wheel 18. Electric switch 34 can be interconnected through control circuitry, as described below, and can be moved to a forward or rearward position to drive wheel 18 forwardly or rearwardly by the motor system contained therein as will also be described further below.

In another embodiment front wheel 18 can be steered by a remote control steering system controlled by a remote control unit as seen in FIG. 2. Remote control units for operating motors are well known in the prior art. When utilized with the drive unit of this invention, the remote control unit directs a signal to remote control circuitry 60 which is contained within battery housing 20 and positioned adjacent to battery 54. Remote control circuitry 60 then directs electric steering motor 24 by a wire not seen in this view to rotate in one direction or the other. Steering motor 24 is supported within motor housing 25, and its shaft is engaged to shaft 26 by belt 94. As steering motor 24 rotates in a first direction, it will rotate steering shaft 26 in one direction and when motor 24 is rotated in the other direction, it will rotate shaft 26 in the other direction, thereby remotely steering the golf cart. A potentiometer 92 is disposed on the bottom of steering motor 24 and is adapted to send a signal to control circuitry 60 as to when motor 24 has caused the amount of shaft movement to rotate yoke 23 to direct front wheel 18 in the desired direction. Shaft housing 22 is located above yoke 23 which yoke is attached to shaft 26 and is rotatable under shaft housing 22. Motor housing 25 is attached to shaft housing 22. Shaft housing 22 contains shaft 26 which can rotate therein in order to rotate yoke 23. Positioned to the rear of shaft housing 22 is a removable battery housing 20 which contains battery 54, control circuitry 96 and remote control circuitry 60. Also seen in FIG. 2 are first and second power lines 56 and 58 directing power from battery 54 to control circuitry 96 and through electrical line 62 running down first yoke side 41 to aperture 21 in first axle shaft member 42 and then to drive motor 46 to which line 62 provides electricity. All the control circuitry could also alternatively be located in shaft housing 22. Drive motor 46, as described further below, operates through a gear reduction assembly rotating drive gear 50 which in turn rotates bevel gear 52 therearound which bevel gear is attached to hub 44 and causes front wheel 18 to rotate in either a forward or reverse direction depending on the direction of rotation of drive motor 46. Battery housing 20 can be detachable from shaft housing 22 for storage with the electrical lines plugging in and out of well-known electrical socket and receptacle-type mechanisms not illustrated. Also located on shaft housing 22 is lower extension bracket 108 which is disposed below upper extension bracket 102. Upper extension bracket 102 attaches motorized front wheel drive unit 19 of this invention to golf cart 10. Lower extension bracket 108 is collapsible to assist in the folding up of the structure as will be described below and has an adjustable extension member 110 extending therefrom which is attached to upper extension bracket 102 by pivoting attachment member 112. Lower extension bracket 108 can have a piston-like configuration or equivalent structure to be extendable. The other end of lower extension bracket 108 is attached to shaft housing 22 by means of lower extension bracket pivoting attachment member 106. This configuration allows movement of drive unit 19, once battery pack 22 has been removed, positioning it closer to cart central support member 98 as will be described further below. One end of upper support bracket 102 is attached within handle receipt member 104 by screws or other means. Handle receipt member 104 exists on prior art golf cart 10. Upper support bracket 102 extends approximately 12 inches over to upper support bracket coupling 33 positioned near the top of shaft 26. Shaft 26 rotatably extends through support bracket coupling 33, thereby still allowing steering of front wheel 18 manually or by a steering motor as described above. When shaft joint 35, as seen in FIG. 1, is loosened, it allows shaft 26 to pivot inward at such joint. This shaft pivoting when front wheel 18 is rotated somewhat sideways after shaft joint 35, which is a toothed split in the shaft held together by a bolt and a handle threaded on such bolt and tightened, has been loosened by loosening the handle and battery pack 20 has been removed, allows front wheel 18 to be moved closer toward cart central support member 98 as extension bracket 108 collapses, thereby moving drive unit 19 closer to cart central support member 98 for storage. In some instances for storage purposes it may be desirable to remove handle 30 from steering handle shaft coupling 31 so that the collapsed drive unit and cart can be conveniently stored within a car trunk and the like for easy transport thereof.

Drive motor 46, as seen in FIG. 2, is disposed parallel to the direction of movement of front wheel 18 within hub 44. Drive motor 46 can be an electric motor such as a ⅛ horsepower motor which can have a gear reduction ratio of 70:1 within its gear reduction assembly 48 so that when a speed of 11,000 rpm is utilized through gear reduction assembly 48, bevel ring gear 52 can be driven at approximately 2–4 miles per hour while the body of the drive motor remains generally stationary. The speed of the motor can be controlled by control circuitry 96 which can be disposed within battery housing 20. The drive motor can be a 12 volt DC proportional voltage motor. Ball bearings can be utilized within shaft housing 22 to promote and facilitate easy steering, such bearings located at both time top and the bottom of the shaft housing and within upper support bracket coupling 33 within which shaft 26 rotates during steering of front wheel 18.

Although the present invention has been described with reference to particular embodiments, it will be apparent to those skilled in the art that variations and modifications can be substituted therefor without departing from the principles and spirit of the invention.

I claim:

1. An accessory device for use on a golf bag cart having a pair of rear wheels and a central support member, said central support member having a cart handle receipt member, comprising:

a front wheel unit having a forwardly and rearwardly rotatable front wheel, said front wheel unit attached to said central support member, said front wheel having a first side and a second side;

control means for controlling the speed and direction rotation of said front wheel;

means to steer said front wheel unit;

an electric drive motor contained within said front wheel unit, said drive motor having a rotatable shaft;

a battery to provide power to said drive motor;

a drive gear mounted on said shaft;

a ring gear mounted concentric with, and parallel to, said front wheel inside said front wheel unit, said ring rear driven by said drive gear on said drive motor shaft such that as said drive motor rotates, it turns said drive gear on said drive motor shaft which in turn drives said ring gear, causing said front wheel to rotate;

a hub member disposed within said front wheel, said hub member housing said drive motor, said drive gear and said ring gear;

a yoke disposed around said first and second sides of said front wheel;

an axle extending from said hub member to said yoke;

a steering shaft having an upper portion and a lower portion, said lower portion connected to said yoke;

a handle attached to said upper portion of said steering shaft, said handle including manually operated means to selectively activate said control means controlling the forward and rearward direction of rotation of said front wheel, said handle provided for the manual steering of said front wheel unit; an upper support bracket coupling engaged around said upper portion of said steering shaft with said steering shaft rotatable therein; and an upper support bracket extending from said upper support bracket coupling to said cart handle receipt member, said upper support bracket attaching said front wheel unit to said golf bag cart.

2. The device of claim 1 further including:
a shaft housing disposed above said yoke; and
a lower extension bracket pivotally attached to said shaft housing, said lower extension bracket extending, and pivotally attached, to said upper support bracket, said lower extension bracket including means to lengthen and contract its length as desired.

3. The device of claim 2 further including a shaft joint disposed on said steering shaft, said shaft joint selectively allowing the portion of said steering shaft disposed below said shaft joint to pivot when desired.

4. The device of claim 3 further including a battery housing holding said battery and control system, said battery housing being removably attached to said shaft housing.

5. The device of claim 3 wherein said means to steer said front wheel unit further includes a steering motor to steer said front wheel unit in a desired direction, said steering motor rotatably interconnected to said steering shaft to rotate said steering shaft and said yoke attached to said front wheel unit to steer said front wheel unit; and
a remote control unit to operate said control means wherein said remote control unit also controls said direction of steering of said steering motor.

* * * * *

UNITED STATES PATENT AND TRADEMARK OFFICE
CERTIFICATE OF CORRECTION

PATENT NO.   : 5,375,673

DATED        : December 27, 1994

INVENTOR(S)  : Amiel J. McCall and Roger M. Marino

It is certified that error appears in the above-indentified patent and that said Letters Patent is hereby corrected as shown below:

On the Title Page, item [54] and column 1, line 2, the title should read --GOLF BAG CART ACCESSORY DRIVE UNIT--.

Signed and Sealed this

Twenty-first Day of March, 1995

Attest:

BRUCE LEHMAN

*Attesting Officer*            *Commissioner of Patents and Trademarks*